This invention is concerned with novel processes for the coating of paper, and with the novel compositions used in those processes. In particular, it is concerned with novel compositions comprising pigments of very small size which are used as a prime coating for paper in preparing it for printing.

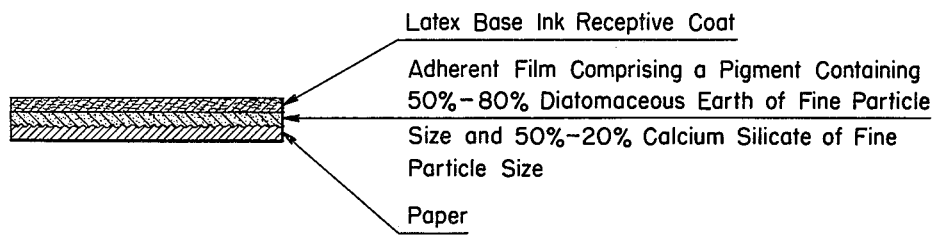
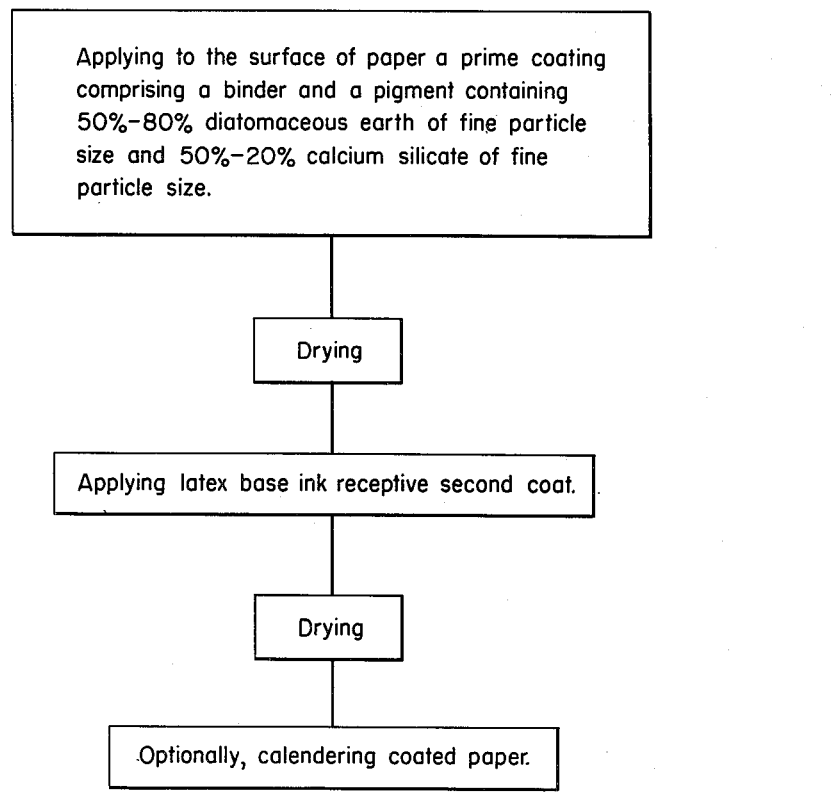
FIG. 1
FIG. 2
INVENTOR.
MORRISON N. STILES 3,005,727
COATING COMPOSITIONS AND PROCESSES FOR MAKING PAPER MORE RECEPTIVE TO INK
Morrison N. Stiles, Green Farms, Conn., assignor to Time, Incorporated, New York, N.Y., a corporation of New York
Filed Feb. 6, 1958, Ser. No. 713,561
4 Claims. (Cl. 117—76)

In order for paper to be useful for printing, its surface must be receptive to ink. The surface of all paper contains irregularities. When seen in cross-section under magnification, these irregularities give the appearance of mountains and valleys. The more irregular the surface, the less satisfactory the printing results will be. For this reason, the surface of paper is generally prepared prior to the printing operation. Most of the prior art methods involve a calendering operation in which the paper is run through closely spaced rollers under considerable pressure. By calendering the elevations are flattened and more nearly uniform dimensions are obtained. There are, however, several disadvantages to calendering. While the elevations are flattened, the depressions are left largely unaffected, and the result is a paper which, although dimensionally fairly uniform, is of uneven density, and lacks uniformity in its reception of the printing ink. The method of the present invention provides a novel and improved method of overcoming these difficulties.

In the drawing, FIGURE 1 is an enlarged cross-sectional view of a coated paper product of the invention and FIGURE 2 is a flow-sheet illustrating a process of the invention for producing a product illustrated by FIGURE 1.

The heart of the present invention lies in the novel type of prime coat. The prime coat acts as a leveling coat. It provides a level substratum for a second, ink receptive coat. By itself, the prime coat is not a good printing surface, but when covered with a second coat, it provides a greatly improved printing surface. The present process avoids the need for calendering, and therefore has the additional advantage that the paper obtained is of high bulk, i.e. it has a high volume and a low density. The avoidance of calendering results in a paper of greater strength, since calendering tends to decrease the strength. The present process also provides paper which has less show-through, i.e. printing on the other side of the paper or on the page underneath is less visible. Most significantly, the coatings of the present invention increase the weight of the paper by a smaller amount than the prior art coatings. The resulting saving of shipping weight is one of the chief advantages of the present invention.

It has been discovered that the particle size of the pigment used in the prime coat is of great importance. The compositions employed in the present invention for the prime coat comprise a mixture of diatomaceous earth of fine particle size and calcium silicate of fine particle size. It is impossible to specify a particle size of diatomaceous earth because it is a heterogeny of complex hollow shapes consisting of microscopic empty shells of diatons and other protophyta. The calcium silicate employed should preferably have an average particle size falling in the range of from about 0.02 to 0.035 micron and a surface area from about 80 to 150 square meters per gram. It is to be understood that these sizes are in the nature of averages in that both smaller and larger particles may also be present, but the particles will largely be within the stated range.

The prime coat pigments of the present invention have the unexpected advantage that unlike previously used pigments, they mask the irregularities in ink receptivity that exist between a valley filled with a great deal of coating and a hill covered with very little. For masking to be accomplished, the particle size of the pigment is of great importance. When coarse size pigments are used, the print has a spotty, uneven, "galvanized" appearance, greatly different from that obtained by the present invention. On the other hand, when the particle sizes are too small, the amount of binder must be increased to the point where printing is adversely affected. Suitable diatomaceous earth of fine particle size is commercially available from Johns Manville under the trade name Superfloss. Suitable calcium silicate of fine particle size is R. T. Vanderbilt's precipitated material known by the trade name Vansil. Columbia Southern's Silene V is also a suitable calcium silicate.

The pigment comprises from about 50 to 80% diatomaceous earth and from about 50 to 20% calcium silicate. Calcium silicate requires large amounts of binder to make it adhere to the paper. For this reason, calcium silicate cannot be used alone as the pigment since the ratio of binder to pigment would be much too high.

The amount of binder required is decreased as the amount of diatomaceous earth in the pigment increases, and at least about 50% of the pigment must be diatomaceous earth so that the binder content may be decreased to a useful range. When the amount of diatomaceous earth in the pigment is increased to above about 80%, however, the quality of the printing surface declines due to the effects of dilatancy.

The present invention, therefore, is based on the discovery that when used in the proper ratios, a mixture of diatomaceous earth and fine particle size calcium silicate in a prime coating improves the quality of printing. The discovery was quite unpredictable in view of the fact that the prime coating is itself coated with a second coating. In some unexplained way, however, the composition of the prime coat acts through the second coat to determine printing quality.

Various types of material may be used as the binder for the prime coat, the choice being determined by printing quality, adhesive efficiency and compatibility with the second coat to be used. Starch ethers, for example Penford gum, are preferred, although alpha protein, casein, polyvinyl alcohol and other materials may be used. As previously mentioned, the amount of binder required increases as the amount of calcium silicate increases. In general, using the preferred mixture of approximately 80% diatomaceous earth and 20% calcium silicate in the pigment, the pigment to binder ratio is approximately 3 to 1. The pigments and binder are incorporated into an aqueous slurry. The solids content of this aqueous slurry is preferably as high as possible since the smaller the amount of water present, the less work involved in drying the coated paper. The composition results in a film which shrinks very little on drying. Mixtures containing approximately 37% solids have given very satisfactory results.

Particularly in the case of very coarse board, the prime coat is preferably applied to the paper surface by a trailing blade applicator. The trailing blade coater has a trowelling action which leaves most material in the valleys and least on the elevations. By trailing blade application, a smooth level surface is obtained. The coat will be thick enough to fill the deepest depressions and cover the highest elevations. It will be present as an adherent film. In the case of paper which is relatively smooth to begin with, a Faeber or Consolidated coater, or an air knife, may be used in place of a trailing blade applicator.

As previously mentioned, the pigments of the present invention composition have the advantage that unlike previously used coating pigments, they mask the irregularities in ink receptivity that exist between a valley filled with a great deal of coating and a hill covered with very little. Moreover, they have the important advantage of imparting relatively little weight to the paper. The prime coating as applied by the trailing blade coater generally has a weight of from 2.5 to 3.5 pounds per thousand square feet of paper in the case of extremely uneven board, and the weight is of course considerably less in the case of more even paper.

Following the novel prime coat of the present invention, a second or top coat is used to provide a good printing surface. The specifications for the top coat are that it should be compatible with the prime coat, there should be enough of it to cover the prime coat smoothly and evenly and it should print well. Many such types of coating are known and may be used in the present invention. A preferred example is a latex base coating containing clay and titanium dioxide pigments.

The second coat is preferably applied by a trailing blade, but other methods such as a Faeber coater may be used. The second coat is generally relatively thin and serves merely to receive the ink. It therefore contributes little weight. Following the application of the second coat, it is sometimes desirable to subject the paper to an extremely light calendering, for example one nip between steels at roll weight only. Latex based second coats give high printing quality, and since they are mobile after drying, they can be smoothed with little ironing. Latex based second coats also have the ability to help fine particle size pigments in masking "galvanizing."

The following is an illustration of a highly satisfactory second coat. The pigment is a 10 to 1 mixture of clay and titanium dioxide. The binder is a 3 to 1 mixture of Dow's 512L styrene-butadiene latex (protein stabilized) and alpha protein. 23 pounds of binder are used per 100 lbs. of pigment. The coating is applied by trailing blade at a coat weight of approximately 1.6 lbs. per 1000 sq. feet. Many types of second coating may be used satisfactorily, however, and the figures given above are not critical but merely illustrative. Rohm and Haas Rhoplex B–15 (an acrylic) is also a satisfactory latex. American Cyanamid water dispersible, anatase type titanium dioxide O–110 is very satisfactory, as is Edgar Bros. H.T predispersed clay.

The method of the present invention is applicable to all types of paper. It is, however, particularly valuable with extremely coarse, uneven paper, for example bleached kraft board. Uncalendered kraft board has a very irregular surface, the valleys sometimes being as deep as two-thousandths of an inch. The difficulty of printing on such board will be obvious when it is remembered that two-thousandths of an inch represents the entire thickness of many types of paper. In a manner far superior to any previously known, the present invention makes it possible to print on such coarse board without the need for calendering.

What is claimed is:

1. A composition of matter useful as a prime coating for masking the irregularities in ink receptivity of paper surfaces comprising a pigment containing from about 50 to about 80% diatomaceous earth of fine particle size and from about 50 to about 20% calcium silicate of fine particle size, and a binder.

2. A composition of matter useful as a prime coating for masking the irregularities in ink receptivity of paper surfaces comprising a pigment containing from about 50 to about 80% diatomaceous earth of fine particle size and from about 50 to about 20% calcium silicate of fine particle size, the pigment being in an aqueous slurry containing a binder.

3. As a novel article of manufacture, paper coated with an adherent film comprising a pigment containing from about 50 to about 80% diatomaceous earth of fine particle size and from about 50 to about 20% calcium silicate of fine particle size, and coated with a latex base ink receptive second coat.

4. A process for preparing the surface of paper for printing comprising applying to the surface of the paper a prime coating comprising a binder and a pigment containing from about 50 to about 80% diatomaceous earth of fine particle size and from about 50 to about 20% calcium silicate of fine particle size, and then applying a latex base ink receptive second coat.

References Cited in the file of this patent

UNITED STATES PATENTS

| | | |
|---|---|---|
| 1,934,639 | Rafton | Nov. 7, 1933 |
| 1,934,641 | Rafton | Nov. 7, 1933 |
| 1,934,642 | Rafton | Nov. 7, 1933 |
| 2,697,669 | Masterman | Dec. 21, 1954 |
| 2,786,757 | Taylor | Mar. 26, 1957 |
| 2,879,178 | McWherter et al. | Mar. 24, 1959 |

OTHER REFERENCES

Hall Pacific Pulp and Paper Industry, April 1941, pages 50–53.

Casey: "Pulp and Paper," vol. II, Interscience Publishers, Inc., N.Y., 1952.